(12) United States Patent
Ledbetter et al.

(10) Patent No.: US 8,294,305 B1
(45) Date of Patent: Oct. 23, 2012

(54) MODULAR CHARGE CLOSE TRIP DEVICE

(76) Inventors: Finley Lee Ledbetter, Argyle, TX (US);
Ashley Sue Ledbetter, Argyle, TX (US)

( * ) Notice: Subject to any disclaimer, the term of this patent is extended or adjusted under 35 U.S.C. 154(b) by 334 days.

(21) Appl. No.: 12/786,223

(22) Filed: May 24, 2010

Related U.S. Application Data

(63) Continuation-in-part of application No. 12/361,223, filed on Jan. 28, 2009, now Pat. No. 7,804,201, and a continuation-in-part of application No. 12/500,523, filed on Jul. 9, 2009, now Pat. No. 8,151,452.

(60) Provisional application No. 61/084,897, filed on Jul. 30, 2008.

(51) Int. Cl.
*H01H 83/00* (2006.01)
(52) U.S. Cl. ...................................... 307/125
(58) Field of Classification Search .................. 307/125
See application file for complete search history.

(56) References Cited

U.S. PATENT DOCUMENTS

| 5,477,017 | A | 12/1995 | Swindler et al. |
| 6,777,627 | B1 | 8/2004 | Stevenson |
| 6,897,388 | B2 | 5/2005 | Greer |
| 6,951,990 | B1 | 10/2005 | Miller |
| 7,019,230 | B1 | 3/2006 | Vaill et al. |

*Primary Examiner* — Robert L. DeBeradinis
(74) *Attorney, Agent, or Firm* — Gardere Wynne Sewell LLP

(57) ABSTRACT

A modular charge, close, trip device with a charge portion having a charging arm operated by a motor is described herein. A close trip portion can include at least one solenoid that can be mounted on a bracket that can be mounted to a charging arm. The solenoid can have a plunger for engaging buttons on equipment enabling the closing or tripping of switch gear. Magnets can be used to affix the charge portion and the close trip portion to metal surrounding equipment to be charged, closed, or tripped. The modular components can each be operated independently by a remote switch operator, enabling the operator to maintain a position outside an arc flash hazard zone.

20 Claims, 6 Drawing Sheets

MODULAR CHARGE CLOSE TRIP DEVICE

CROSS REFERENCE TO RELATED APPLICATIONS

The present application is a continuation-in-part co-pending U.S. patent application Ser. No. 12/361,223 filed Jan. 28, 2009, entitled "PORTABLE REMOTE SWITCH OPERATOR SYSTEM" and is a continuation-in-part of co-pending U.S. patent application Ser. No. 12/500,523 filed Jul. 9, 2009, entitled "PORTABLE ELECTRICAL EQUIPMENT RACKING TOOL", which claims priority and the benefit of U.S. Provisional Patent Application Ser. No. 61/084,897 filed on Jul. 30, 2008, entitled "CIRCUIT BREAKER REPLACEMENT TOOL". These references are incorporated herein in their entirety.

FIELD

The present embodiments generally relate to a modular motorized charge, close, and trip device having two detachable/attachable components including a charge device with a motorized charging arm that can be remotely controlled for actuation of the device from a safe distance using a portable power supply known as a remote switch operator, and a close trip device having a solenoid operable by the remote switch operator.

BACKGROUND

A need exists for a modular, lightweight, remotely operable, battery powered, portable device that can charge, close/trip, or charge/close/trip while being magnetically secured to a circuit breaker.

The present embodiments meet these needs.

BRIEF DESCRIPTION OF THE DRAWINGS

The detailed description will be better understood in conjunction with the accompanying drawings as follows.

Figure 1:
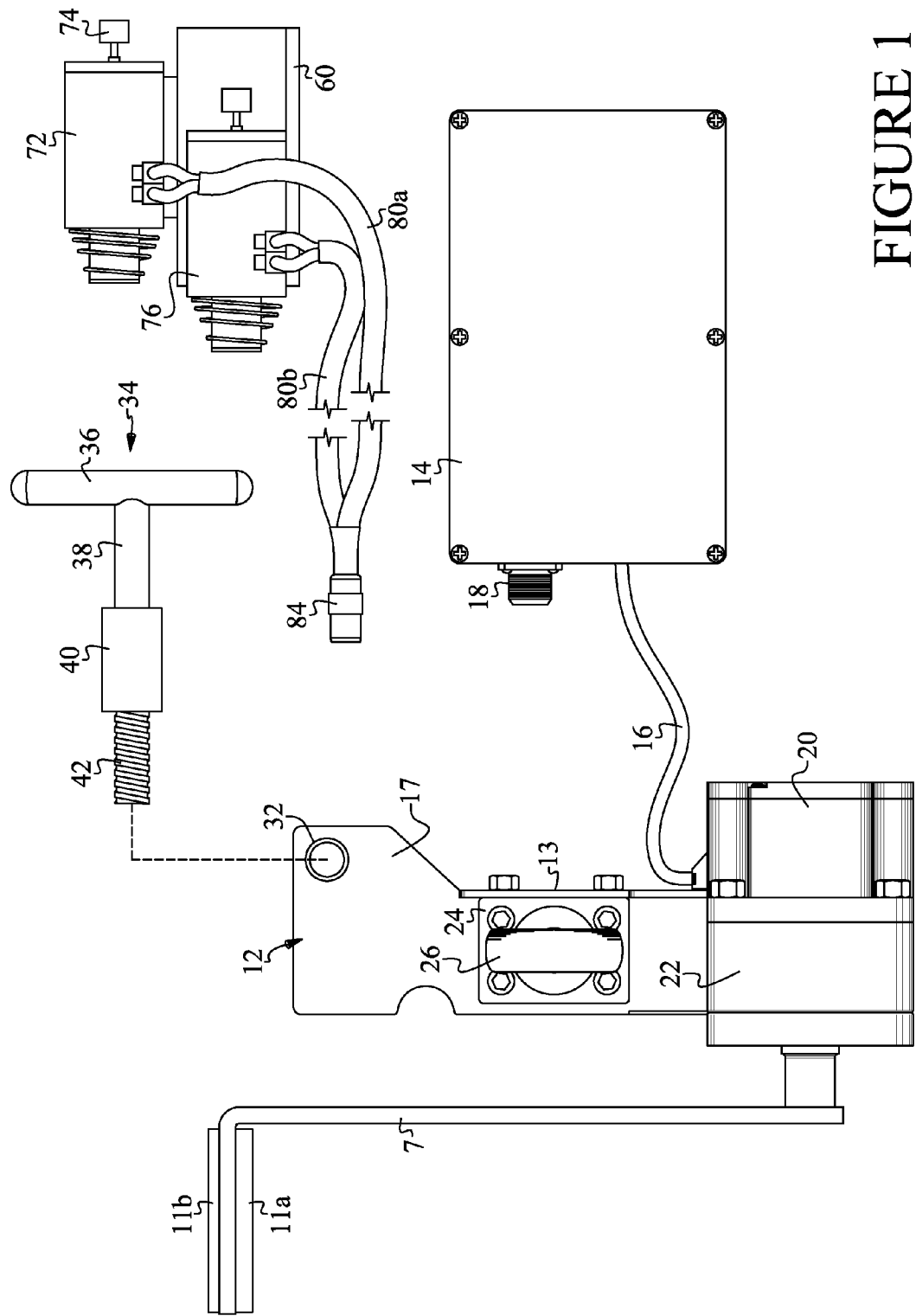
FIG. 1 depicts a top view of an embodiment of the charge, close, trip device.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a modular charge, close, trip device with at least two disconnectable segments, also termed "components", "portions", or "modules" herein, both of which can be operated from at least one remote switch operator termed herein "an RSO". The two disconnectedly segments can be operated simultaneously or in tandem.

In embodiments, each of the disconnectable segments can be operated on two different circuit breakers simultaneously.

In embodiments, the charge device can be operated by the RSO, then removed, and the trip close device can be attached and operated by the RSO.

The charge device can have a charging arm operated by a gear assembly connected to a motor, which can be operated by a control box. The control box can be powered and controlled by the RSO. The charge device can be attachable to electrical equipment for servicing. The charge device can be attached to the electrical equipment by at least one magnet on a motor attachment plate that can support the motor and the charging arm, and by a magnet on the control box.

The trip and close device can include at least one solenoid mounted on a trip and close support that can be a coated metal bracket. The solenoids can have plungers that can be powered and controlled by the same RSO that powers the charge device, or by a completely different RSO.

The solenoid plunger can engage buttons on the electrical equipment being closed or tripped, enabling the closing or tripping of switch gear.

Magnets can be used with the trip and close device to removably affix the trip and close device to metal surrounding the equipment to be charged, closed, or tripped.

The remote switch operator can have a remote controller that can allow an operator to be maintained outside an arc flash hazard zone while operating the charge device, the trip and close device, or combinations thereof.

The modular, charge, close, trip device can enable an operator maintain a safe distance from a gear in an electrical room, so that the operator is not harmed if arcing or shocks occur.

The device can include simple components and does not necessarily require special training to operate.

The device can be lightweight, portable, and can weigh less than fifty pounds when both components are connected together. Each separate component can weigh less than twenty five pounds.

The support components, such as the motor attachment member, the trip and close support, and the charging arm can be made from a lightweight durable composite or a metal covered in plastic to provide a light and easily maneuverable robotic tool.

The device can charge, close, or trip a circuit breaker without drilling holes in the electrical equipment. The device can use, in the charge portion, an attaching mechanism, to attach through the motor attachment plate of the charge portion to a face of the circuit breaker panel without the need to drill a hole.

The device can be used to remove or reattach any variety of DS circuit breakers thereby allowing a user to be able to purchase one modular device for use with all of that user's circuit breakers. For example, a refinery might have from three to fifty different DS style circuit breakers. That refinery can purchase and use a single modular device described herein to remove and reattach every DS style circuit breaker at the refinery. The device can eliminate the need to provide individual attaching devices that are permanently affixed over each circuit breaker.

The device can reduce the cost of maintenance of circuit breakers.

Users of the device can include but are not limited to operators in chemical plants, hospitals, hotel electrical rooms, and other electrical areas with switch gear and circuit breakers.

The operator can operate the units with the remote switch operator's remote controller, so the operator can be completely out of the arc flash zone.

Operators of the device can be from about ten feet to about twenty five feet away from the circuit breaker or electrical equipment being charged, closed, or tripped, thereby preventing electrical shock of the operator.

The modular charge, close, trip device can reduce a facility's need to buy high level protective equipment, enabling the facility to procure lighter weight personal protective equipment that is not as hot, heavy, and not as likely to cause heart attacks in wearers.

Use of the modular charge, close, trip device can reduce liability to an operator because of the reduced exposure time in the arc flash suits due to the quickness of the mechanized charge, closing, and tripping.

The charge, close, trip device can be made from aluminum channel, thin metal plates, such as steel plates, lightweight reinforced plastic panels, such as molded panels, or reinforced composites.

In embodiments, the charging arm can have a length from about three to about sixteen inches.

The motor attachment plate can have a thickness of from about ⅛ inch to about ½ inch. The trip and close support can have a similar plate thickness.

In embodiments, the motor attachment plate can be L-shaped with a hole in the center for the magnet of the charge portion to be rotated and extended.

In embodiments, the trip and close support can be U-shaped, allowing a first solenoid to be contained within the U-shape as well as the trip and close magnetically shielded magnet housing. A second solenoid can be mounted to an outside surface of the U-shaped trip and close support for compactness and to avoid adding any extra plate parts.

The motor attachment member can be plate steel coated with an ion-resistant or static-resistant coating. The motor attachment member can have a length from about 20 percent to about 50 percent of the charging arm. The motor attachment member can have a height that is no greater than the height of the charging arm, thereby keeping the device small and compact.

The motor attachment member can be perforated to create an even more lightweight robotic tool.

The trip and close portion of the device can have at least one solenoid. Each solenoid of the portion can have a moving solenoid plunger that can extend out to engage the electrical device of interest, tripping the electrical device or closing the electrical equipment of interest.

The plunger can be from about one to five inches long and can be a straight rod, a bent rod, or a rod with multiple bends in it to engage the electrical equipment and to move around obstructions.

The motor of the charging portion can be a DC direct drive motor. The motor can be a 12 volt motor.

The device can include a communication mechanism and a power mechanism for providing communication and power between each solenoid of the close and trip module, the control box, and the remote switch operator. The two different mechanisms can be two wires housed in a single conduit, two different wires, or the signal mechanism can be in wireless communication, while the power mechanism can be in a wired configuration.

The two different mechanisms can deliver power and signals simultaneously to each electrical item on either the charge component or the close and trip component of the modular device.

A gear box can be attached to the motor that operates the charging arm. The gear box can be plastic or metal. The gear box can be sized from about 2×2 inches to about 6×8 inches. The gear box can be integral with the motor.

A gear assembly can be in the gear box for engaging the charging arm.

The gear assembly can have a gear box collar with a diameter larger than a connected rotatable shaft. The gear box collar can be at least 20 percent larger in diameter than the rotatable shaft.

The rotatable shaft can have an engagement key in a shaft key way. The engagement key can be a small rod of metal that can be removable. In embodiments, the engagement key can be a square rod two inches long.

The gear box can have a gear box key way and shaft housing for engaging the rotatable shaft. The diameter of the shaft housing can be only slightly larger than the outer diameter of the rotatable shaft.

A communication mechanism for providing communication can connect the motor with the control box. A power mechanism for providing power can connect the motor with the control box. The two mechanisms can be combined into one cable, or the two mechanisms can be separate. The communication mechanism can be wireless.

The control box can be recoverably mounted to the metal around the circuit breaker or target electrical equipment. In embodiments, the control box can be magnetically and removably mountable to the motor attachment member. The device can have a reduced weight making the device quickly attachable and removable, and minimizing operator time in dangerous areas.

An interface plug can be disposed in the control box for receiving power and signals from a remote switch operator (RSO). The RSO can have a remote controller for use by an operator, while the operator maintains a position outside an arc flash hazard zone.

At least one at least partially shielded magnet housing can be connected to the motor attachment member. The housing can contain at least one extendable magnet, such as a two inch diameter magnet. The magnet can be secured to a magnet handle that can be non-magnetic.

The extendable magnets can be rotatable in at least two directions within the at least partially shielded magnet housing by using a magnet handle. The magnets can extend up to 15 percent of their thickness outside of the magnet housing in order to connect to the metal surfaces around the electrical equipment.

The device can communicate from a remote controller that can be in wireless communication with the RSO which can be wired to the charge, close, trip device at a distance of at least 150 feet. The wireless communication can use multiple frequencies.

The device can engage a remote switch operator that can have a housing, such as one made from explosion resistant reinforced plastic. The housing can have a body with a volume, such as 2 feet by 2 feet. The housing can have a closable lid.

The RSO can have a face plate with at least two plugs in the face plate for providing current and signals from the housing to the charge, close, trip device. A DC power plug can be in the face plate for receiving power into the housing of the RSO, such as from a secondary source.

A circuit board can be beneath the face plate in the housing. The circuit board can communicate between relays.

The relays can engage at least one battery or two batteries connected in series. The batteries can be mounted within the housing.

The batteries can be connected to the DC power plug for receiving incoming DC power and for charging the batteries.

The RSO can have a receiver/transmitter in communication with the circuit board and a remote controller which can be removably connected under the face plate for remotely actuating the relays a distance from the remote switch operator. The remote controller can be wireless or in a wired configuration with a retractile cord.

The RSO can have a plurality of buttons on the face plate which can be operated by a remote controller with the same functionality.

The buttons on the face plate of the RSO can include a trip momentary push button engaging the circuit board, a close momentary push button engaging the circuit board, a charge close momentary push button engaging the circuit board, and a jog momentary push button engaging the circuit board.

An on/off switch in the face plate can connect or disconnect the battery with the relay.

A circuit breaker in the face plate can connect between the relays and the on/off switch. A timer circuit board can be in communication between the relays and the circuit board. A first timer potentiometer can be in the face plate and connected to the timer circuit board. A second timer potentiometer can be in the face plate connected to the timer circuit board. A stroke potentiometer can be in the face plate connected to the timer circuit board.

The device can have a charger power supply in the housing beneath the face plate for receiving AC current from an outside source, and an AC plug in the face plate for receiving AC current from the outside source and transferring the AC current to the charger power supply.

The RSO can include a remote controller which can have an on/off button, a jog button, a trip button, a close button, and a charge/close button which can correspond to the buttons on the face plate of the RSO.

Additionally, the RSO remote controller can have an automatic shut off switch on the face plate connected to the circuit board for disabling the modular charge, close, trip device when the modular charge, close, trip device exceeds a preset amperage.

The RSO can have a microprocessor and a flash memory with computer instructions for comparing signals from the potentiometers to a predetermined threshold.

The electrical equipment can be low voltage circuit breakers using up to 1000 volts, medium voltage circuit breakers using from 1000 volts to 20000 volts, a switch gear, or a manually operated circuit breaker.

The motorized modular charge, close, trip device can be remotely controlled to operate on electrical equipment.

Turning now to the Figures, FIG. 1 is depicts an embodiment of the charge, close, trip device as a connected device.

The device can have a charging arm with a charging arm body 7, which can be L-shaped. Insulation 11a and 11b can be disposed on either side of an end of the charging arm body 7.

The charging arm body 7 can attach to a gear box 22 that can be operated by a motor 20.

The motor 20 can receive power and signals from a control box 14 via a communication mechanism 16, which is shown in this embodiment as a cable.

The control box 14 can have a control box interface plug 18 for engaging with a power and communication cord that can connect to a remote switch operator.

The motor 20 and the gear box 22 can be mounted to a motor attachment member 12 which can have an integral first side 13 formed at a 90 degree angle to a motor attachment member back 17.

The motor attachment member back 17 can have a hole through which an extendable magnet can be moved. The partially magnetically shielded magnet support housing 24 can support a moveable magnet handle 26.

An attaching hole 32 can be disposed in the motor attachment member back 17 that can allow an attaching mechanism 34 to be threaded thereto. The attaching mechanism 34 can hold the motor attachment member in a secure and removable engagement with electrical equipment of interest for charging.

The attaching mechanism 34 can have an attaching mechanism handle 36 which can be connected at a right angle to an attaching mechanism body 38. An attaching mechanism screw housing 40 can be attached to the attaching mechanism body 38 and can support a screw 42. The attaching mechanism screw housing 40 can have a diameter larger than the screw 42 and can act as a stop for the attaching mechanism 34, preventing over screwing of the attaching mechanism into a circuit breaker panel or a pre-existing hole in the electrical equipment.

A top view of the trip and close module of the device can be seen including a trip and close support 60 having a U-shape.

A first solenoid 72 with a moveable plunger 74 can be connected to an outer side of a portion of the U-shape. A second solenoid 76 can be connected in a center of the U-shape. A solenoid communication mechanism can provide power to the solenoids 80a and 80b and connect to a remote switch operator. The solenoid communication mechanism 80a, 80b can connect to a solenoid connector 84.

Figure 2:
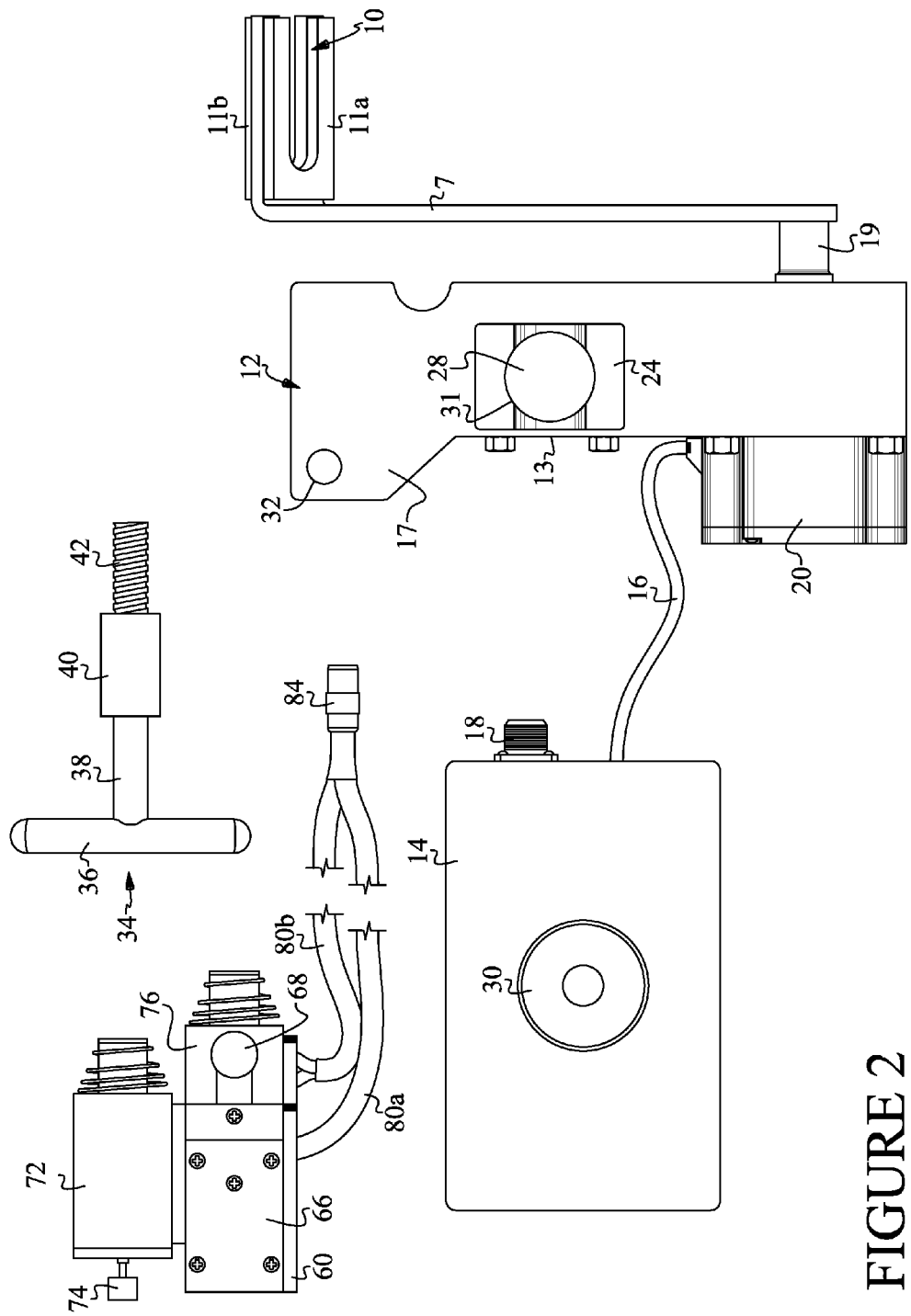
FIG. 2 depicts a bottom view of an embodiment of the charge, close, trip device.

FIG. 2 depicts a bottom view of the charge device component and the trip, close device component along with the removable attachment mechanism.

The control box 14 can have a control box magnet 30 attached to the control box.

The control box 14 can be connected to the motor 20 with the communication mechanism 16. The motor attachment member 12 can have an integral first side 13. The motor attachment member 12 can include a magnet 28 in the magnetically shielded magnet support housing 24.

An attaching hole 32 can be disposed in the motor attachment member back 17 that can allow an attaching mechanism 34 to be threaded thereto. The attaching mechanism 34 can hold the motor attachment member in a secure and removable engagement with electrical equipment of interest for charging.

The attaching mechanism 34 can have an attaching mechanism handle 36 which can be connected at a right angle to an attaching mechanism body 38. An attaching mechanism screw housing 40 can be attached to the attaching mechanism body 38 and can support a screw 42. The attaching mechanism screw housing 40 can have a diameter larger than the screw 42 and can act as a stop for the attaching mechanism 34, preventing over screwing of the attaching mechanism into a circuit breaker panel or a pre-existing hole in the electrical equipment.

The magnet 28 can extend through a magnet hole 31.

The charging arm body 7 can have a charging arm slot 10. A charging arm connector 19 can connect the charging arm body 7 to the gear assembly and motor. Insulation 11a and 11b can be disposed on either side of an end of the charging arm body 7

The device can include an at least partially magnetically shielded magnet housing 66 having a trip and close magnet handle 68 for extending the trip and close magnet.

A first solenoid 72 with a moveable plunger 74 can be connected to an outer side of a portion of the U-shaped trip and close support 60. A second solenoid 76 can be connected in a center of the U-shape. The solenoid communication mechanism 80a, 80b can connect to a solenoid connector 84 that can plug into a connector on a retractile cord or similar cord from a remote switch operator or similar device for supplying power and signals to the trip and close support.

Figure 3:
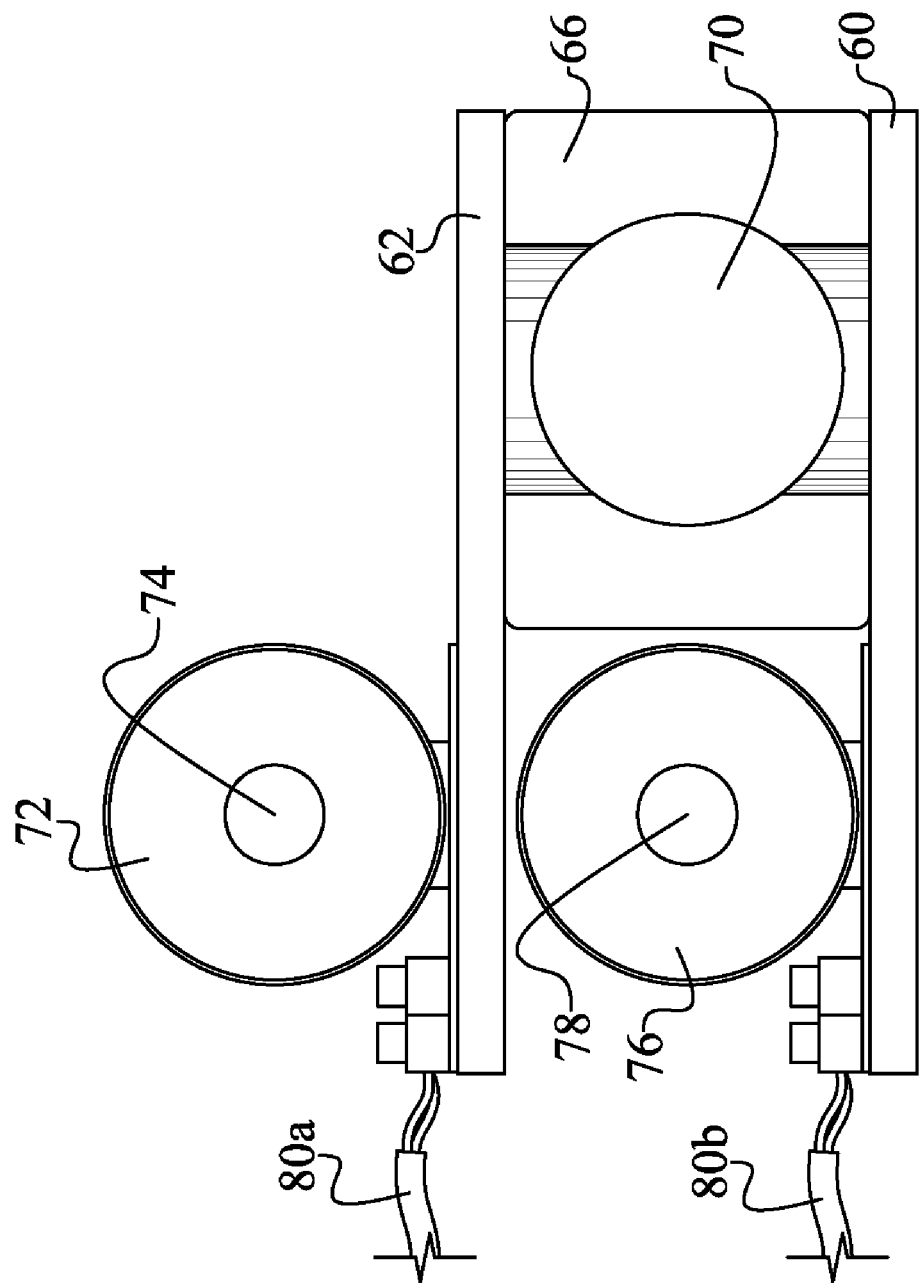
FIG. 3 is a view of a portion of the charge, close, trip device including solenoids and an extendable, retractable trip and close magnet.

FIG. 3 depicts a side view of a portion of the charge, close, trip device with an extendable, retractable trip and close magnet 70 within the at least partially magnetically shielded magnet housing 66.

The device can include moveable plungers 74 and 78 extending from the solenoids 72 and 76, respectively.

One or more embodiments can include one, two, three, four, or more solenoids.

The device can include the trip and close support 60 and a trip and close support side 62. The device can be connected to the solenoid communication mechanism 80a, 80b.

Figure 4:
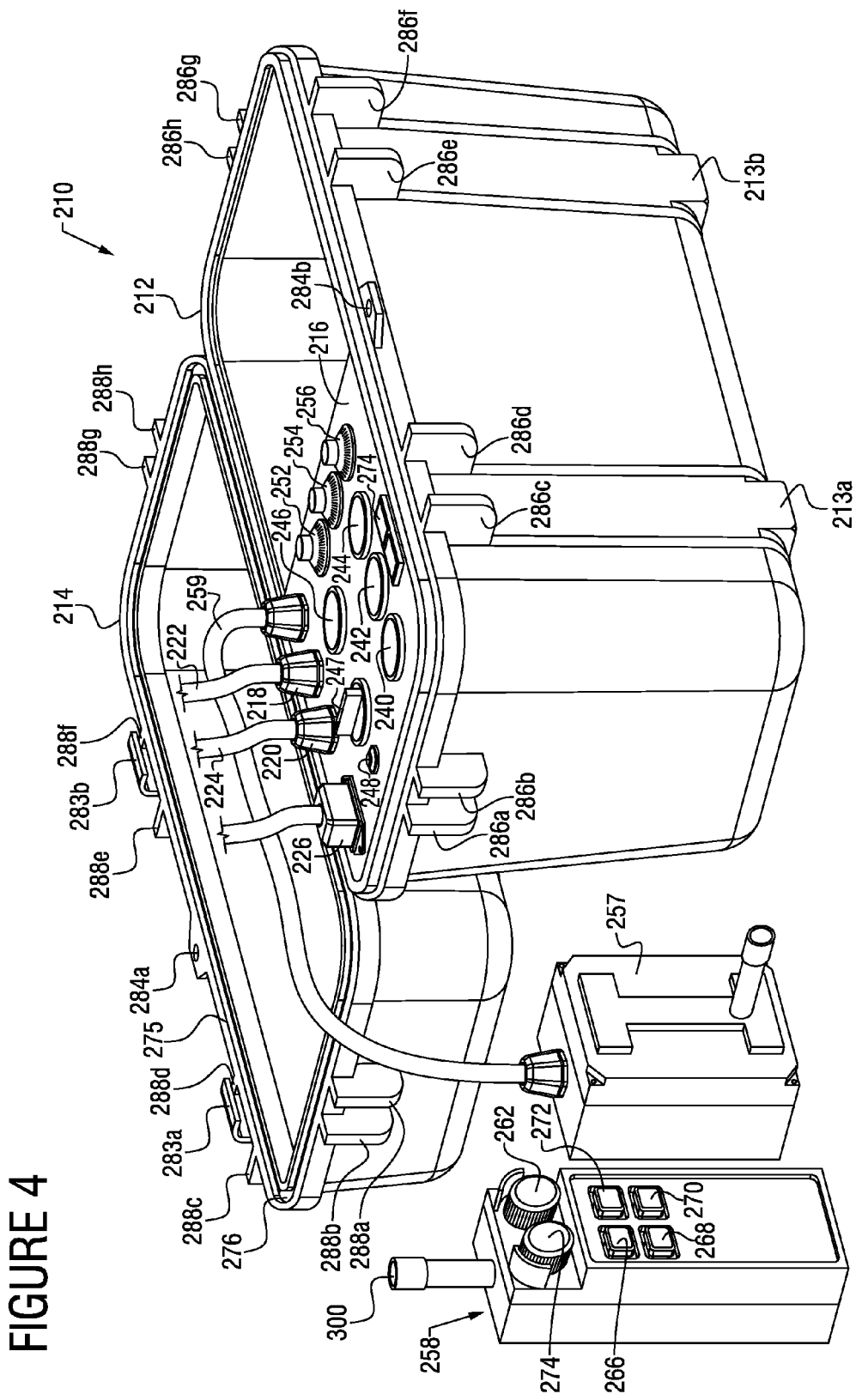
FIG. 4 depicts a remote switch operator.

FIG. 4 is a front perspective view of the RSO housing 210 with body 212 and lid 214.

A groove 275 can be formed in the lid 214 on the side facing the body 212. A seal 276 can be disposed in the groove 275, such as a rubber gasket or other mechanism to keep water from entering the housing when the lid 214 is latched to the body 212. The seal 276 can be a continuous rubberized gasket about ⅛ inch in diameter.

Latching mechanisms 283a and 283b can connect the lid 214 to the body 212. In embodiments, only one latching mechanism can be used.

Locking mechanism 284a and 284b can be used to lock the lid 214 to the body 212.

The body 212 can have rigid integral support feet 213a and 213b.

Body reinforcing ribs 286a, 286b, 286c, 286d, 286e, 286f, 286g, and 286h can be disposed on a side of the body 212, and can be molded into the body 212.

Lid reinforcing ribs 288a, 288b, 288c, 288d, 288e, 288f, 288g, and 288h can be formed in the lid 214 as the lid is molded.

The face plate 216 can have a first plug 218 for transmitting current and signal from the housing to the charge, close, trip device.

The face plate 216 can have a second plug 220 for additionally transmitting current and signals from the housing to the charge, close, trip device.

A first cord 222 can engage the first plug 218. A second cord 224 can engage the second plug 220.

A DC charge plug 226 can be disposed in the face plate 216 for receiving DC power from a battery charger, such as an AC/DC charger or from an inverter that is remote to the housing.

A trip momentary push button 240 can be in the face plate 216 for simultaneously sending signals and power to the at least one solenoid of the charge, close, trip device from the RSO.

A close momentary push button 242 can be in the face plate 216 for simultaneously sending signals and power to the at least one solenoid of the charge, close, trip device from the RSO.

A charge/close momentary push button 244 can connect between the circuit board and the battery for sending signals and power to the motor of the charge, close, trip device.

A jog momentary push button 246 can connect between the circuit board for controlling the motors from the RSO.

An on-off switch 247 can connect and disconnect the batteries from relays.

A circuit breaker 248 can be in the face plate 216 and can interrupt the circuit between the batteries and the relays when amperage exceeds a preset limit.

A first stroke potentiometer 252 can count strokes that operate the motor of the charge, close, trip device, such as how many times to rotate the rotatable shaft.

A first timer potentiometer 254 can provide signals to the motor of the charge, close trip device, such as how long, in units of time, to turn the rotatable shaft in a first direction.

A second timer potentiometer 256 can provide signals to the motor of the charge, close, trip device, such as how long, in units of time, to turn the rotatable shaft in a second direction.

A radio transmitter receiver 257 can be connected by a cord 259 to the relays and the batteries under the face plate 216.

An automatic shut off switch 274 can be in the face plate 216 for emergency use.

A wireless remote controller 258 with an antenna 300 can communicate with the RSO 210. The wireless remote controller can also have an automatic shut off switch 274 to disengage the RSO in case of an emergency.

The wireless remote controller 258 can have an on/off button 262 that can communicate to the RSO. Additionally, the wireless remote controller 258 can have a job button 266, a trip button 268, a close button 270, and a charge/close button 272 for controlling the circuits of the push button in a wireless manner.

Velcro™ or another attaching mechanism can be used to secure the wireless radio controller 258 to the interior of the housing for easy transport.

Figure 5:
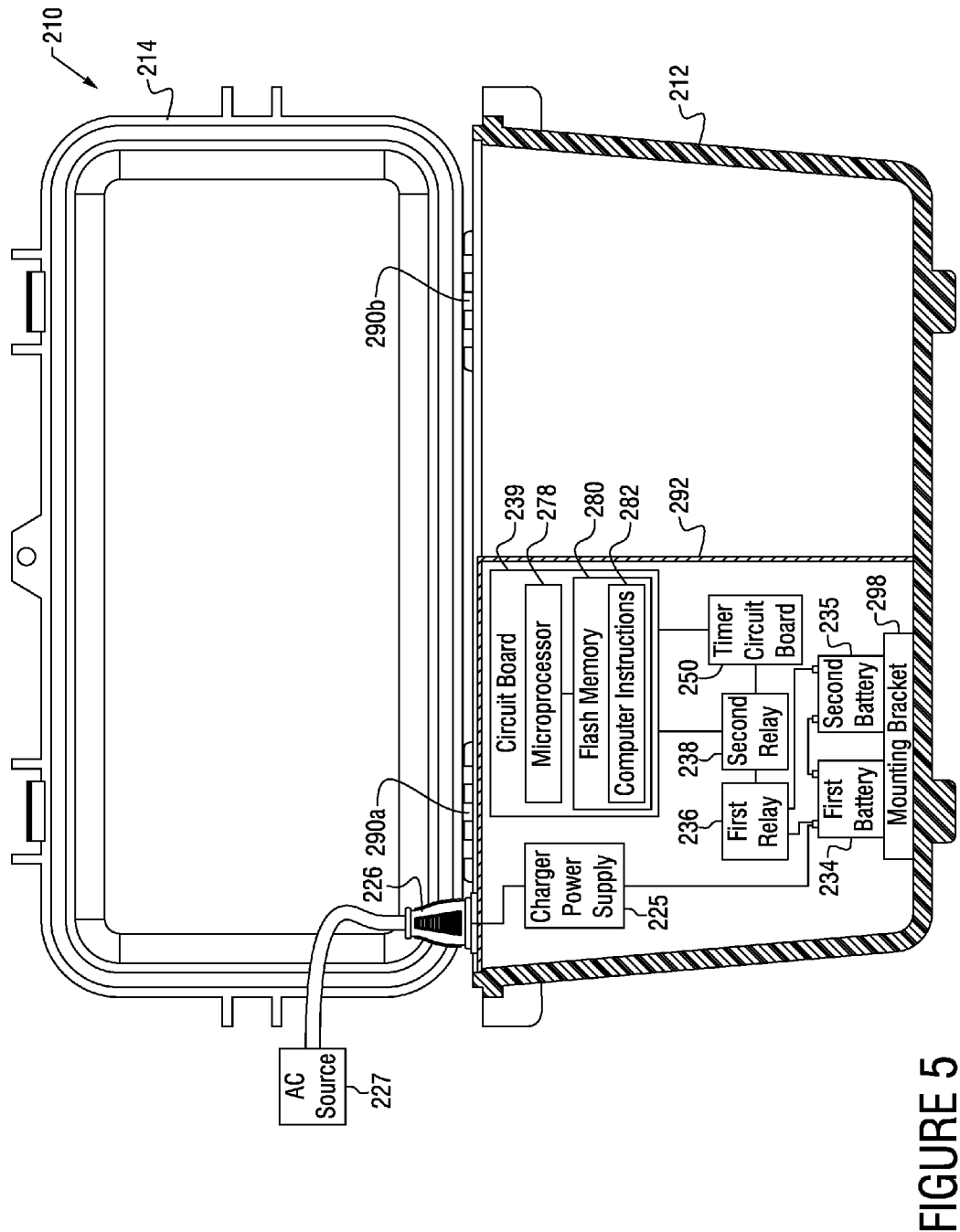
FIG. 5 depicts a detail of the electronics of a remote switch operator.

FIG. 5 is a view of the RSO 210.

The circuit board 239 can have a microprocessor 278 connected to a flash memory 280 with computer instructions 282 for comparing current sensed to predetermined limits, and when those limits are exceeded, shutting off the power coming from the RSO 210 to the charge, close, trip device.

The body 212 and lid 214 can be connected by a first hinge 290a and second hinge 290b.

The face plate can have a face plate side 292 connecting to the face plate for securing other equipment tightly into the housing and preventing water from entering the electronics under the face plate.

The RSO 210 can have a first relay 236 and a second relay 238 which can be in communication with a first battery 234 and a second battery 235.

The timer circuit board 250 can be between the relays and the circuit board.

The batteries can be mounted on mounting bracket 298 in the housing.

A charger power supply 225 can engage the batteries.

An AC source 227 can be connected to the RSO 210 through a plug 226.

Figure 6:
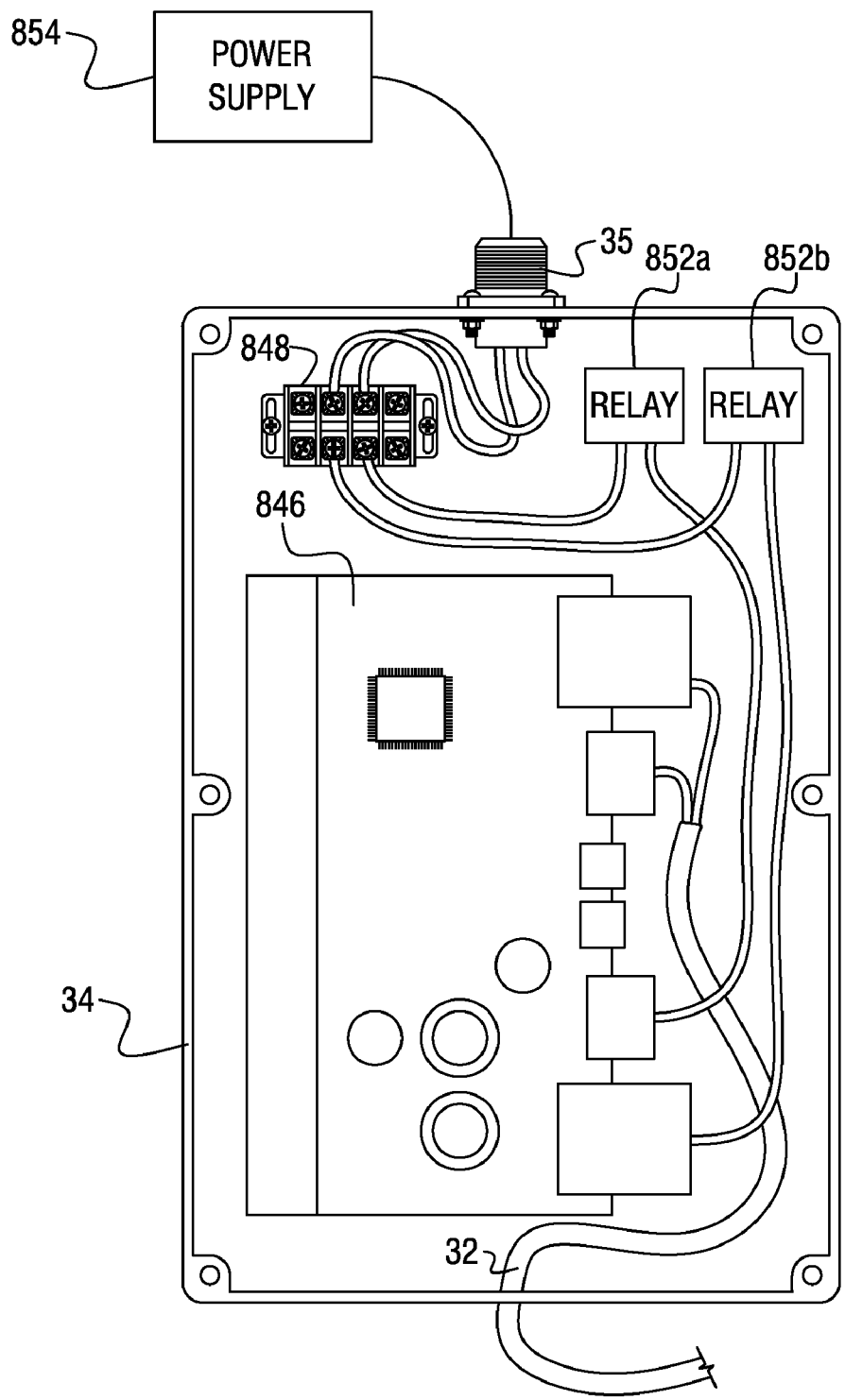
FIG. 6 depicts a control box.

FIG. 6 shows a top view of the control box that controls the motor of the robot.

In embodiments, the control box 34 can be made from aluminum or another lightweight metal alloys. The control box 34 can have a back and four sides all connected together and a removable top.

The control box 34 can receive power from a power supply 854 through the interface plug 35 on the control box.

Current can flow through the connectors 848 to relays 852a and 852b. From the relays, power can flow to the motor control circuit board 846. The motor signal and power cable 32 can run from the motor control circuit board to the motor.

While these embodiments have been described with emphasis on the embodiments, it should be understood that within the scope of the appended claims, the embodiments might be practiced other than as specifically described herein.

What is claimed is:

1. A charge system comprising:
   a. a charging arm comprising a charging arm slot and a charging arm connector disposed on the charging arm;
   b. a motor attachment member with a first side;
   c. a motor connected to the motor attachment member;
   d. a gear box with a gear assembly attached to the motor, wherein the gear assembly engages the charging arm connector;
   e. a control box with a control box interface plug for engaging a remote switch operator;
   f. a communication mechanism for providing power between the control box and the motor;
   g. at least one magnet support housing with an extendable magnet secured to the motor attachment member; and
   h. at least one magnet control housing with a control box magnet contained therein for securing the control box to a metal surface near electrical equipment needing charging.

2. The charge system of claim 1, wherein the electrical equipment is a low voltage circuit breaker using up to 1000 volts, a medium voltage circuit breaker using from 1000 volts to 20000 volts, a switch gear, or a manually operated circuit breaker.

3. The charge system of claim 1, further comprising a trip and close device, wherein the trip and close device comprises:
   a. a trip and close support;
   b. at least one solenoid mounted to the trip and close support, wherein the at least one solenoid has a solenoid plunger for engaging an actuating button on the electrical equipment;
   c. a solenoid communication mechanism for providing communication to the at least one solenoid from the remote switch operator;
   d. a trip and close magnetically shielded magnet housing mounted to the trip and close support; and
   e. a trip and close extendable/retractable magnet in each trip and magnet housing.

4. The charge system of claim 3, wherein the trip and close support has a trip and close support first side that is parallel with a trip and close support second side connected to a trip and close back for supporting each of the at least one solenoid.

5. The charge system of claim 3, further comprising at least one trip and close magnet handle connected to each trip and close extendable/retractable magnet for rotatably extending and retracting each trip and close extendable/retractable magnet.

6. The charge system of claim 3, further comprising a solenoid connector at one end of the solenoid communication mechanism that engages the remote switch operator.

7. The charge system of claim 3, wherein the trip and close support is mounted to the charging arm.

8. The charge system of claim 3, wherein the solenoid communication mechanism simultaneously provides power and communication to the at least one solenoid.

9. The charge system of claim 1, further comprising a magnet handle for extending and retracting the extendable magnet in the at least one magnet support housing.

10. The charge system of claim 9, wherein the extendable magnet is rotatable within the at least one magnet housing the magnet handle.

11. The charge system of claim 1, further comprising an insulator disposed around the charging arm slot.

12. The charge system of claim 1, further comprising a magnet hole formed in the motor attachment member allowing extension and retraction of the extendable magnet through the motor attachment member.

13. The charge system of claim 1, wherein the motor attachment member further comprises an attachment hole for allowing an attaching mechanism to secure the charge system to a circuit breaker.

14. The charge system of claim 13, wherein the attaching mechanism comprises an attaching mechanism handle, an attaching mechanism body secured to the attaching mechanism handle, an attaching mechanism screw housing attached to the attaching mechanism body, and a screw disposed within the attaching mechanism screw housing for engagement with the circuit breaker.

15. The charge system of claim 1, wherein the remote switch operator comprises:
   a. a housing with a body and a closable lid;
   b. a face plate in the body;
   c. a first plug in the face plate for providing current and signals from the housing to the charge system;
   d. a DC power plug in the face plate for receiving power into the housing;
   e. a circuit board disposed beneath the face plate and within the housing engaging at least one relay, wherein the at least one relay engages at least one battery connected to the DC power plug for connecting to a DC power source and for charging the at least one battery;
   f. a receiver/transmitter adjacent the face plate and within the housing in communication with the circuit board;
   g. a trip momentary push button in the face plate engaging the circuit board;
   h. a close momentary push button in the face plate engaging the circuit board;
   i. a charge close momentary push button in the face plate engaging the circuit board;
   j. a jog momentary push button in the face plate engaging the circuit board;
   k. an on/off switch in the face plate for connecting or disconnecting the at least one battery with the at least one relay;
   l. a removable remote controller in communication with the receiver/transmitter in the housing for remotely tripping, closing, charge closing, jogging, and turning on/off the remote switch operator while located a distance from the remote switch operator;
   m. a circuit breaker in the face plate connected between the at least one relay and the on/off switch;
   n. a timer circuit board in the housing beneath the face plate in communication between the at least one relay and the circuit board;
   o. a first timer potentiometer in the face plate connected to the timer circuit board;
   p. a second timer potentiometer in the face plate connected to the timer circuit board; and
   q. a stroke potentiometer in the face plate connected to the timer circuit board, wherein the remote switch operator provides power and signals simultaneously to the charge system using the removable remote controller.

16. The charge system of claim 15, further comprising a charger power supply in the housing beneath the face plate for receiving AC current from an outside source, and an AC plug in the face plate for receiving the AC current from the outside source and transferring the AC current to the charger power supply.

17. The charge device of claim 15, further comprising an automatic shut off switch on the face plate connected to the circuit board for disabling the charge system when the charge system exceeds a preset amperage.

18. The charge system of claim 15, wherein the removable remote controller comprises a member of the group consisting of: an on/off button, a jog button, a trip button, a close button, a charge/close button, an automatic shut off button, and combinations thereof for remotely actuating the remote switch operator.

19. The charge system of claim 15, wherein the remote switch operator further comprises a microprocessor and a flash memory with computer instructions for comparing signals from each potentiometer to a predetermined threshold.

20. A trip and close device comprising:
 a. a trip and close support;
 b. at least one solenoid mounted to the trip and close support, wherein the at least one solenoid has a solenoid plunger for engaging an actuating button on electrical equipment;
 c. a solenoid communication mechanism for providing communication to the at least one solenoid from a remote switch operator;
 d. a solenoid power mechanism for providing power to the at least one solenoid from the remote switch operator;
 e. a trip and close magnet housing mounted to the trip and close support; and
 f. a trip and close extendable/retractable magnet in the trip and close magnet housing.

* * * * *